United States Patent
Lin et al.

(10) Patent No.: US 8,595,533 B2
(45) Date of Patent: Nov. 26, 2013

(54) POWER MANAGEMENT SYSTEM, METHOD THEREOF AND STORAGE MEDIUM

(75) Inventors: I-Chieh Lin, New Taipei (TW); Mao-Kang Wang, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 321 days.

(21) Appl. No.: 13/014,877

(22) Filed: Jan. 27, 2011

(65) Prior Publication Data

US 2012/0084592 A1    Apr. 5, 2012

Related U.S. Application Data

(60) Provisional application No. 61/388,713, filed on Oct. 1, 2010.

(30) Foreign Application Priority Data

Dec. 15, 2010    (TW) ................................ 99144044 A

(51) Int. Cl.
*G06F 1/00*    (2006.01)
*G06F 3/00*    (2006.01)

(52) U.S. Cl.
USPC .............................. 713/324; 713/323; 710/18

(58) Field of Classification Search
USPC ............ 713/300, 310, 320, 323–324; 710/18, 710/300, 105–106, 305–306, 313–314; 719/321, 327
See application file for complete search history.

(56) References Cited

U.S. PATENT DOCUMENTS

| | | | |
|---|---|---|---|
| 6,363,491 B1 * | 3/2002 | Endo .............................. | 713/310 |
| 6,567,921 B1 * | 5/2003 | Guziak ......................... | 713/322 |
| 6,665,801 B1 * | 12/2003 | Weiss ............................. | 713/300 |
| 7,103,788 B1 * | 9/2006 | Souza et al. .................. | 713/323 |
| 2002/0138776 A1 * | 9/2002 | Cohen et al. .................. | 713/320 |
| 2005/0010828 A1 * | 1/2005 | Oh ................................. | 713/300 |
| 2005/0033869 A1 * | 2/2005 | Cline ................................ | 710/8 |
| 2005/0156038 A1 * | 7/2005 | Wurzburg et al. ............. | 235/435 |
| 2005/0198417 A1 * | 9/2005 | Chaiken et al. ............... | 710/104 |
| 2005/0246455 A1 * | 11/2005 | Bhesania et al. ................ | 710/10 |
| 2008/0072086 A1 * | 3/2008 | Kim ............................... | 713/323 |
| 2008/0104422 A1 * | 5/2008 | Mullis et al. .................. | 713/300 |
| 2008/0298289 A1 * | 12/2008 | Jeyaseelan ..................... | 370/311 |
| 2009/0193156 A1 * | 7/2009 | Suematsu ........................ | 710/14 |
| 2010/0162022 A1 * | 6/2010 | Kim et al. ..................... | 713/324 |
| 2010/0169522 A1 * | 7/2010 | Fleming ........................ | 710/100 |
| 2011/0047305 A1 * | 2/2011 | Kim et al. ....................... | 710/63 |
| 2011/0072284 A1 * | 3/2011 | Lyra et al. ..................... | 713/320 |
| 2012/0151239 A1 * | 6/2012 | Wang ............................. | 713/324 |

FOREIGN PATENT DOCUMENTS

JP    2003114834 A  *  4/2003
WO  WO 2012044050 A2 *  4/2012

OTHER PUBLICATIONS

Fleming, Kris. "Power saving of using USB Selective Suspend Support Whitepaper". Version 0.6. May 20, 2003. Intel Corporation. Pages 1-7.*

* cited by examiner

*Primary Examiner* — Thomas J Cleary

(74) *Attorney, Agent, or Firm* — Stout, Uxa, Buyan & Mullins, LLP

(57) ABSTRACT

A power management method for a host computer, which is coupled to a USB hub, is provided. It prevents the USB hub from entering into a suspend mode while the host computer stays in a host active state. The method includes the following steps: a filter driver is loaded. When detecting a specified event, the filter driver issues a device sleep IRP request to control the USB hub enter into a suspend mode. Wherein the specified event represents that the host computer enters into a host sleep state.

14 Claims, 5 Drawing Sheets

POWER MANAGEMENT SYSTEM, METHOD THEREOF AND STORAGE MEDIUM

CROSS-REFERENCE TO RELATED APPLICATIONS

The entire contents of U.S. Provisional Application No. 61/388,713, filed on Oct. 1, 2010 and entitled MECHANISM TO LET A USB HUB ENABLE SLEEP BATTERY CHARGING FUNCTION, and Taiwan Patent Application No. 099144044, filed on Dec. 15, 2010, from which this application claims priority, are incorporated herein by reference.

BACKGROUND OF THE INVENTION

1. Field of the Invention

The present invention generally relates to a management system, and more particularly to a power management system and method thereof.

2. Description of Related Art

The handheld devices or portable devices, such as a USB flash, not only can be used to transfer data, but also can be used to perform charging by plugging it in the interface connecting port (e.g. USB connecting port) of the computer. However, it has the limitation about the number of the interface connecting port in the computer. In order to communicate with the computer for more handheld devices, the USB hub is developed to connect the handheld devices and the computer.

Referring now to FIG. 1A, an architecture diagram illustrating the traditional power management system according to an embodiment is shown. The power management system 1 includes a host computer 11 and a USB hub 13. The USB hub 13 includes a plurality of sub connecting ports 13a-13c which is provided at least one portable device 15 to plug in to interact with the host computer 11. The host computer 11 includes a CPU 111, a south north bridge 113, a memory 115, and an interface connecting port 117. The CPU 111 is configured to control the whole operations within the host computer 11. The south north bridge 113 is configured to control the units within the host computer 11, such as the memory 115 and input/output circuit, to transmit signals or data with the CPU 111. The memory 115 is configured to store the operating system (OS) and a plurality of drivers, the operating system would be loaded from the memory 115 when the host computer 11 is power-on, and the corresponding drivers would also be loaded based on the hardware architecture configured in the host computer 11 to control the operation of the hardware.

The interface connecting port 117 is configured to interface the USB hub 13 to the host computer 11. Take a USB connecting port as example, there is a USB host controller 1131 within the south north bridge 113, which controls the portable device 15 that are plugged in the sub connecting ports 13a-13c.

Referring now to FIG. 1B, an architecture diagram illustrating a USB switch of the USB hub according to one embodiment is shown. As shown in FIG. 1B, a USB switch 14 of the USB hub 13 is corresponding to one of the sub connecting ports 13a-13c, such as the sub connecting port 13a. The USB switch 14 is controlled by the USB host controller 1131 of the host computer 11 to switch whether the sub connecting port 13a connects a data transmission circuit 16 or a dedicated charge circuit 17. The USB data transmission differential pairs (e.g. D+/D− signal ends) of the sub connecting port 13a can be coupled to the interface connecting port 117 of the host computer by the data transmission circuit 16, and the USB data transmission differential pairs of the sub connecting port 13a can be shorted (e.g. couple with an impedance unit 12 such as a resistance) by the dedicated charge circuit 17 to enable charging function. According to another embodiment, the USB switch 14 can be disposed in any position on the USB hub 13. Specifically, if the USB hub 13 is in an active mode, the portable device 15 plugged-in can transmit data with the host computer 11 each other through the data transmission circuit 16. If the USB hub 13 is in a suspend mode (or sleep mode), the USB switch 14 is switched to use the dedicated charge circuit 17 rather than the data transmission circuit 16, and USB hub 13 receives the electricity (or the independent power of the USB hub 13, not shown) provided from the host computer 11 through the interface connecting port 117 to perform charging for the portable devices 15 (whether any portable device 15 is plugged-in or not).

Broadly speaking, the operating system (such as Microsoft Windows, Linux, and Apple Mac OS, includes the default driver for USB hub 13) of the host computer includes a predetermined USB hub driver which detects whether the USB hub 13 connects the portable devices 15. If there is not any portable device 15 coupling to the USB hub 13 for a while, the USB hub 13 may be controlled to be in the suspend mode, and the USB switch 14 is switched to use the dedicated charge circuit 17 to perform charging. However, the host computer 11 is still in the active mode, that is, due to the behavior of the predetermined USB hub driver as described, the USB hub 13 cannot detect actually power mode of the host computer 11, and cannot enter suspend mode according to the actually power mode. In this case, the sleep charging function of the USB hub 13 may not be implemented. Furthermore, when the host computer is in a host active state (S0 state), even user plugs-in the portable device 15 in the sub connecting ports 13a-13c, the USB hub 13 cannot transmit data of the portable device 15 because the USB hub 13 enters suspend mode, and which causes users to suppose the sub connecting ports 13a-13c cannot work or be destroyed.

In view of the above drawback, a need has arisen to propose a novel power management system and method thereof in which the mode of the USB hub can directly reflect the power mode of the host computer.

SUMMARY OF THE INVENTION

In view of the foregoing, it is an object of the embodiment of the present invention to provide a novel power management system and method thereof to control the mode of the USB hub to directly reflect the power mode of the host computer by a filter driver filtered the requests from the host computer.

According to one embodiment, a power management system which avoids a USB hub entering into a suspend mode while the host computer stays in a host active state is provided. The power management system includes a plurality of sub connecting ports. The host computer includes a CPU configured to execute an operating system (OS) and couple with the USB hub. Wherein, the CPU further loads a filter driver. The filter driver detects a specified event to issue a first device sleep IRP request and control the USB hub to enter into the suspend mode. The specified event represents that the host computer enters into a host sleep state.

According to another embodiment, a power management method for a host computer, which is coupled to a USB hub, is provided. It prevents the USB hub from entering into a suspend mode while the host computer stays in a host active state. The method includes the following steps: a filter driver is loaded. When detecting a specified event, the filter driver issues a first device sleep IRP request to control the USB hub enter into a suspend mode. Wherein the specified event represents that the host computer enters into a host sleep state.

According to another embodiment, a storage medium, saving a filter driver which is loaded in a host computer, is provided for the host computer to perform a power management method. The host computer is coupled to a USB hub, and the method prevents the USB hub from entering into a suspend mode while the host computer stays in a host active state. The method includes the following steps: a filter driver is loaded. When detecting a specified event, the filter driver issues a first device sleep IRP request to control the USB hub enter into a suspend mode. Wherein the specified event represents that the host computer enters into a host sleep state.

DETAILED DESCRIPTION OF THE INVENTION

Figure 1A:
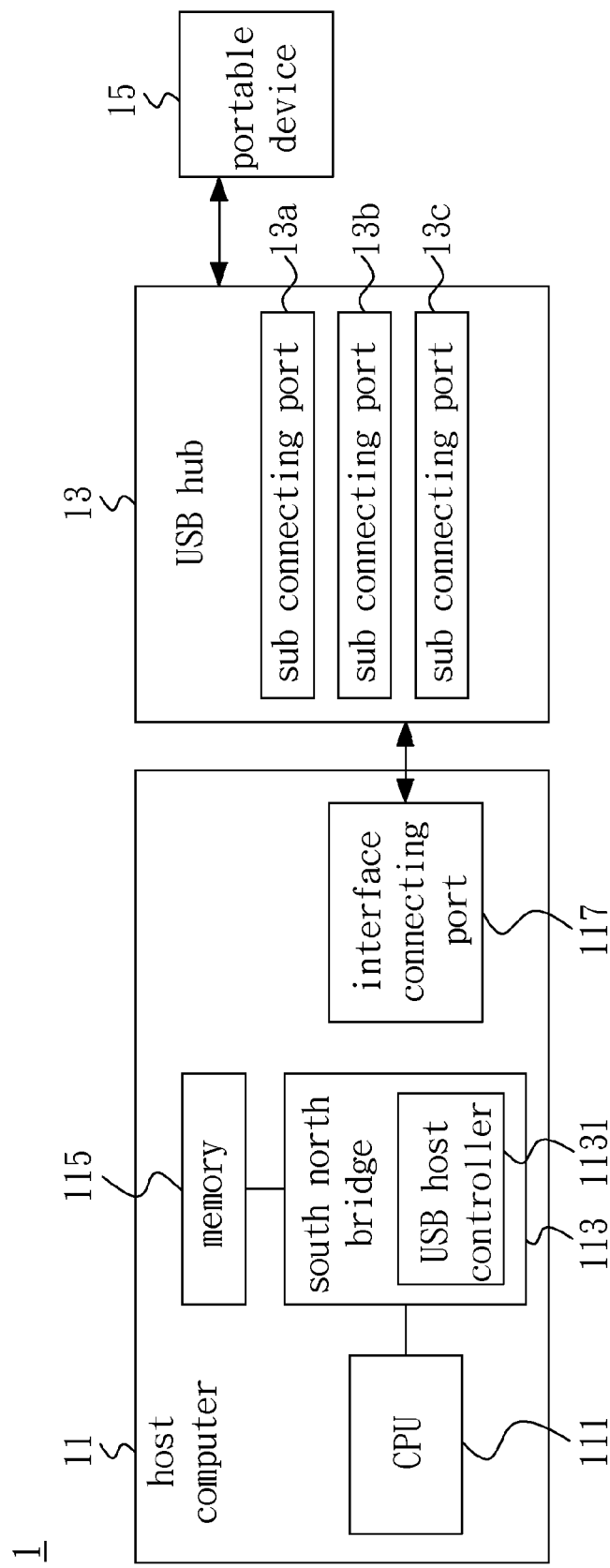
FIG. 1A shows an architecture diagram illustrating the traditional power management system according to an embodiment.
Figure 1B:
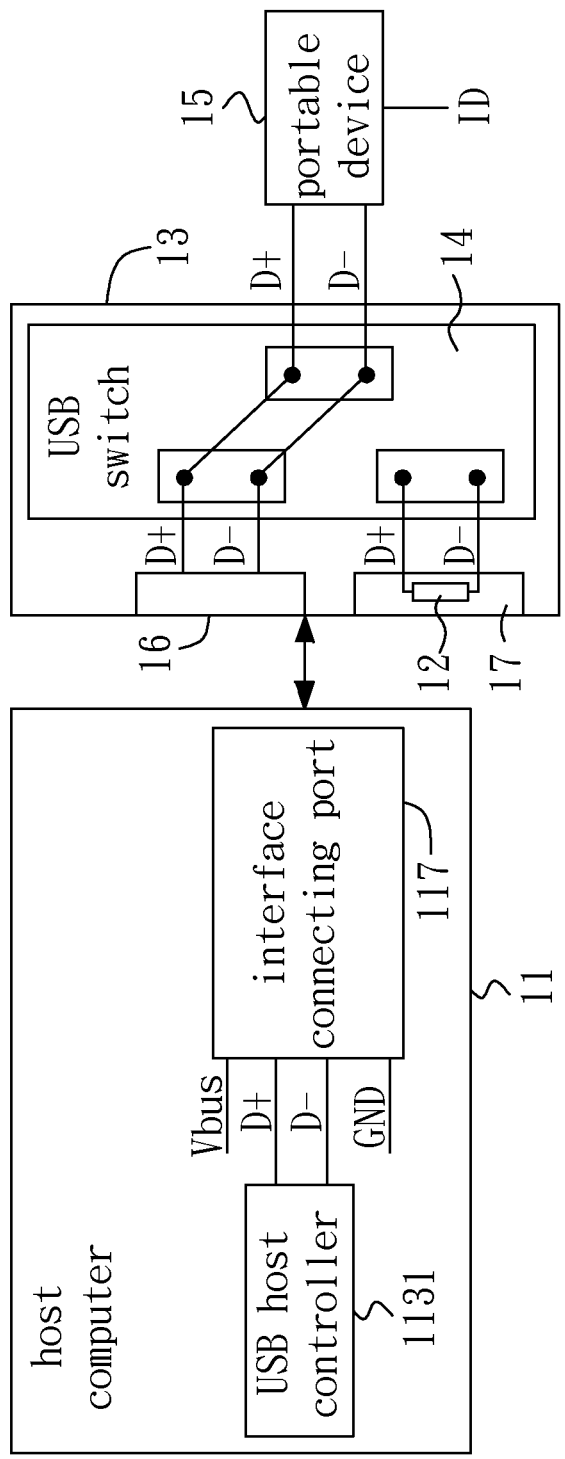
FIG. 1B shows an architecture diagram illustrating a USB switch of a USB hub according to one embodiment.
Figure 2:
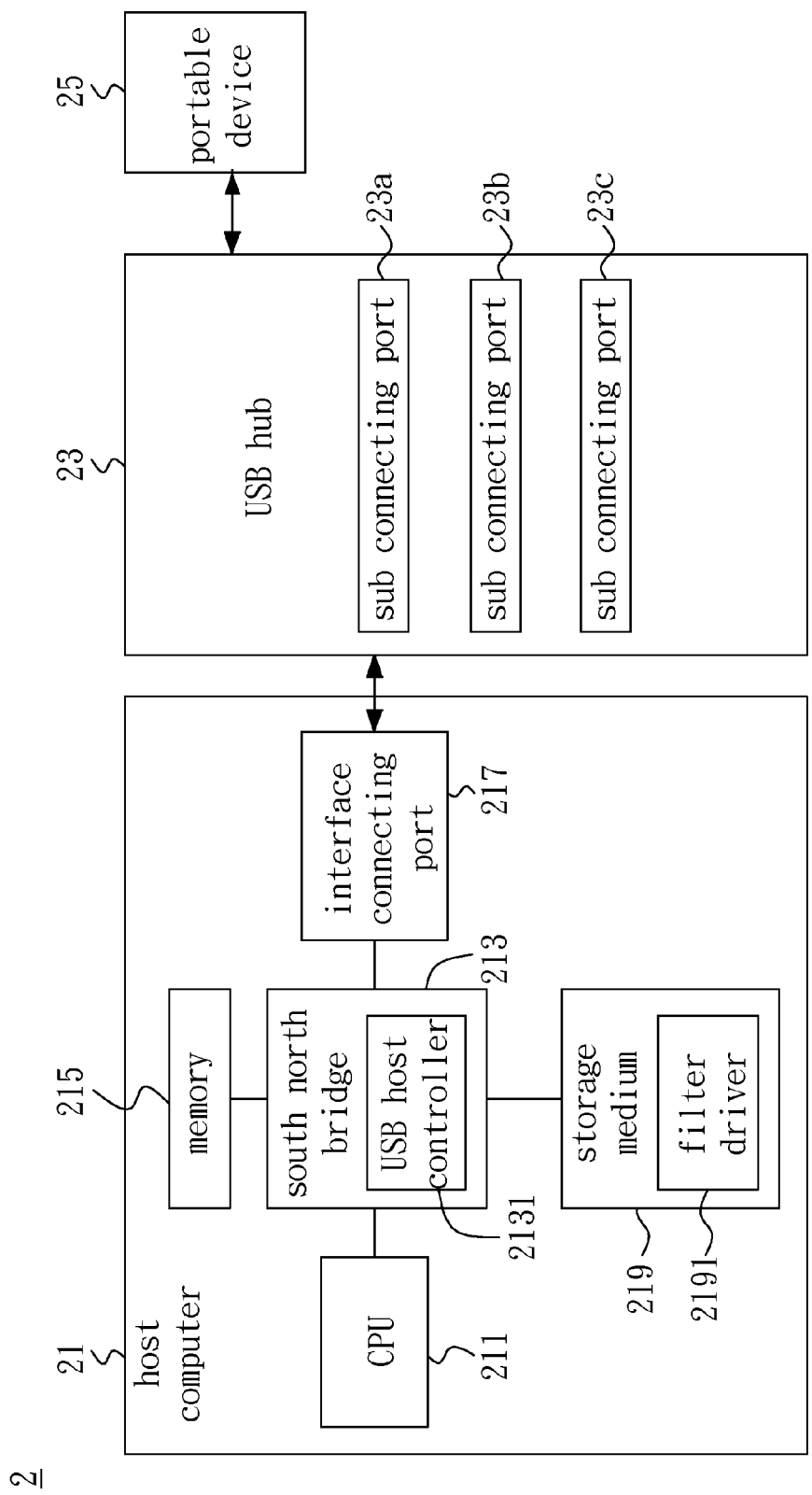
FIG. 2 shows an architecture diagram illustrating a power management system according to one embodiment of the present invention.

Referring now to FIG. 2, an architecture diagram illustrating a USB switch of a USB hub according to one embodiment is shown. As shown, the power management system 2 includes a host computer 21 and a USB hub 23. The host computer 21 has a CPU 211, a south north bridge 213, a memory 215, a storage medium 219, and an interface connecting port 217. The CPU 211 is configured to control the whole operations within the host computer 21. The south north bridge 213 is configured to control the units within the host computer 21, such as the memory 215 and input/output circuit, to transmit signals or data with the CPU 211. The memory 215 is configured to store the operating system (OS) and a plurality of drivers, the operating system would be loaded from the memory 215 when the host computer 21 is power-on, and the corresponding drivers would also be loaded based on the hardware architecture configured in the host computer 21 to control the operation of the hardware.

The USB hub 23, having a plurality of sub connecting ports 23a-23c which supports charging function, is configured to couple to the host computer 21 through the interface connecting port 217. When the USB hub 23 enters into active mode, a portable device plugged in the sub connecting ports 23a-23c can transmit data with the host computer 21. When the USB hub 23 enters into suspend mode, it disables data transmission function and receives the electricity provided from the host computer 21 through the interface connecting port 217 to perform charging for the portable devices 25. Take the interface connecting port 217 is a USB connecting port as example, there is a USB host controller 2131 within the south north bridge 213, which controls the USB hub 23 that are plugged in the interface connecting port 217 and the coupled portable device 25. The interface connecting port 217 includes a USB 3.0 connecting port, or any other standard connecting port, but is not limited to this.

In Advanced Configuration and Power Interface (ACPI) standards, the CPU 211 includes several power modes, such as S0-S4 states. The S0 state is defined as an active mode, and the S2-S4 states are defined as a suspend mode. The CPU 211 controls the units within the host computer 21 and the peripheral devices thereof adaptively according to its state. In order to change the USB hub 23's mode in accordance with the power mode of the CPU 211, the present embodiment provides a filter driver 2191, stored in the storage medium 219, is used to filter an input/output request packet (I/O Request Packet) which is issued to the USB hub 23 by the host computer 21. In one embodiment, the filter driver 2191 may be stored in the memory 215. The storage medium 219 includes an internal storage device (such as Random Access Memory (RAM), Dynamic RAM (DRAM), Static RAM (SRAM), or Flash Memory) within the host computer 21 as shown, and an external storage device (such as optical disc, portable disk, or external magnetic disk). In one embodiment, the filter driver 2191 is operated between an upstream driver and a downstream driver, and it prevents the USB hub 23 from entering into a suspend mode while the host computer stays in a host active state, which is described in more detail below.

Figure 3:
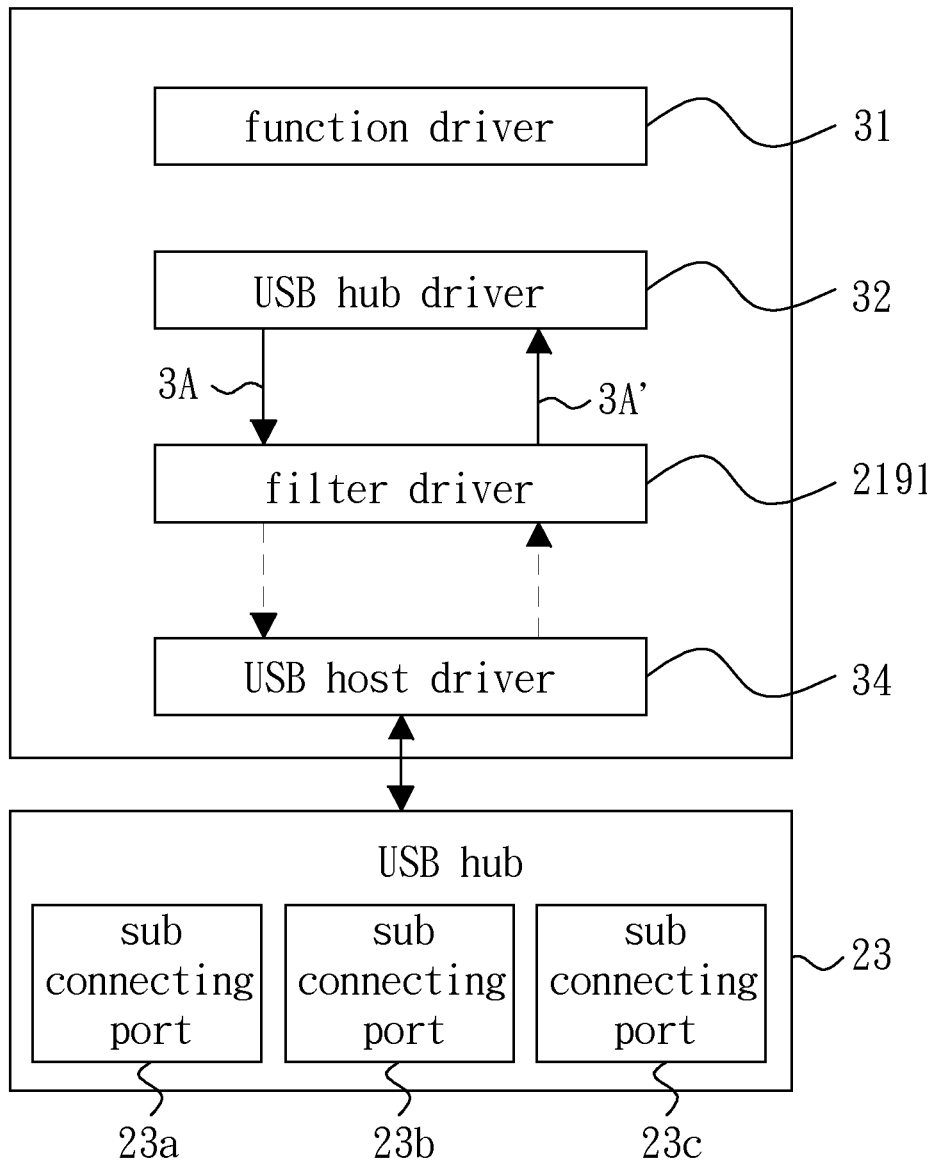
FIG. 3 shows a diagram illustrating IRP transmission according to one embodiment of the present invention.

Generally, after the host computer 21 loads the operating system, it continues loading and calling some drivers to control the USB hub 23. For example, the driver architecture in the Microsoft Windows operating system is layer-by-layer. The IRP (I/O Request Packet) is used to transmit the request of each layer to each driver. When receiving the IRP, the driver performs corresponding process according to its content. If the driver that receives the IRP is not the destination, then continues calling the destination driver. Referring now to FIG. 3, a diagram illustrating IRP transmission according to one embodiment of the present invention is shown. For ease of description, the drivers are represented as objects as shown. After starting the host computer 21, it executes power on self test (POST) process and loads the operating system from the memory 215, and then executes a function driver 31 to initialize all units of the host computer 21. In one embodiment, the filter driver 2191 is loaded into operating system from the storage medium 219 when initializing, so that the operating system recognizes a specific USB hub.

The operating system calls a predetermined USB hub driver 32 to detect whether the sub connecting ports 23a-23c of the USB hub 23 is idle for a while. If so, it indicates that the sub connecting ports 23a-23c do not connect any portable device 25. In this case, the USB hub driver 32 issues a device sleep IRP request 3A to command the USB hub 23 to enter a suspend mode. When the filter driver 2191 that operates between the USB hub driver 32 and a USB host driver 34 receives the device sleep IRP request 3A, the filter driver 2191 filters (holds up) it. Therefore, the device sleep IRP request 3A may not be transmitted to the USB host driver 34, which prevents the USB hub 23 from entering suspend mode. The filter driver 2191 holds up the device sleep IRP request 3A and responses a pseudo sleep IRP response 3A' to the USB hub driver 32, and further to the operating system, which deceives the operating system into thinking that the USB hub 23 has been set into the suspend mode successfully. However, the USB hub 23 does not enter suspend mode actually, the portable device 25 plugged in the sub connecting ports 23a-23c can transmit data with the host computer 21 when a wake-up event occurs.

In one embodiment, when the host computer 21 exits the host active mode and enter a host suspend mode such as S2 state, the filter driver 2191 may detect that such ACPI event occurs, and then issue the device sleep IRP request 3A to the USB host driver 34. The USB host driver 34 further transmits it to the USB hub 23 to command the USB hub 23 to enter suspend mode. In one embodiment, the filter driver 2191 may wait the USB host driver 34 to response a sleep IRP response, which indicates that the USB hub 23 has slept. In another case, the filter driver 2191 may wait for a while (until timeout) and terminate its process.

In one embodiment, as long as the IRP that the filter driver 2191 received is transmitted from the USB host driver 34 (downstream) to the USB hub driver 32 (upstream), the filter driver 2191 always transmits it and never holds it up.

Figure 4:
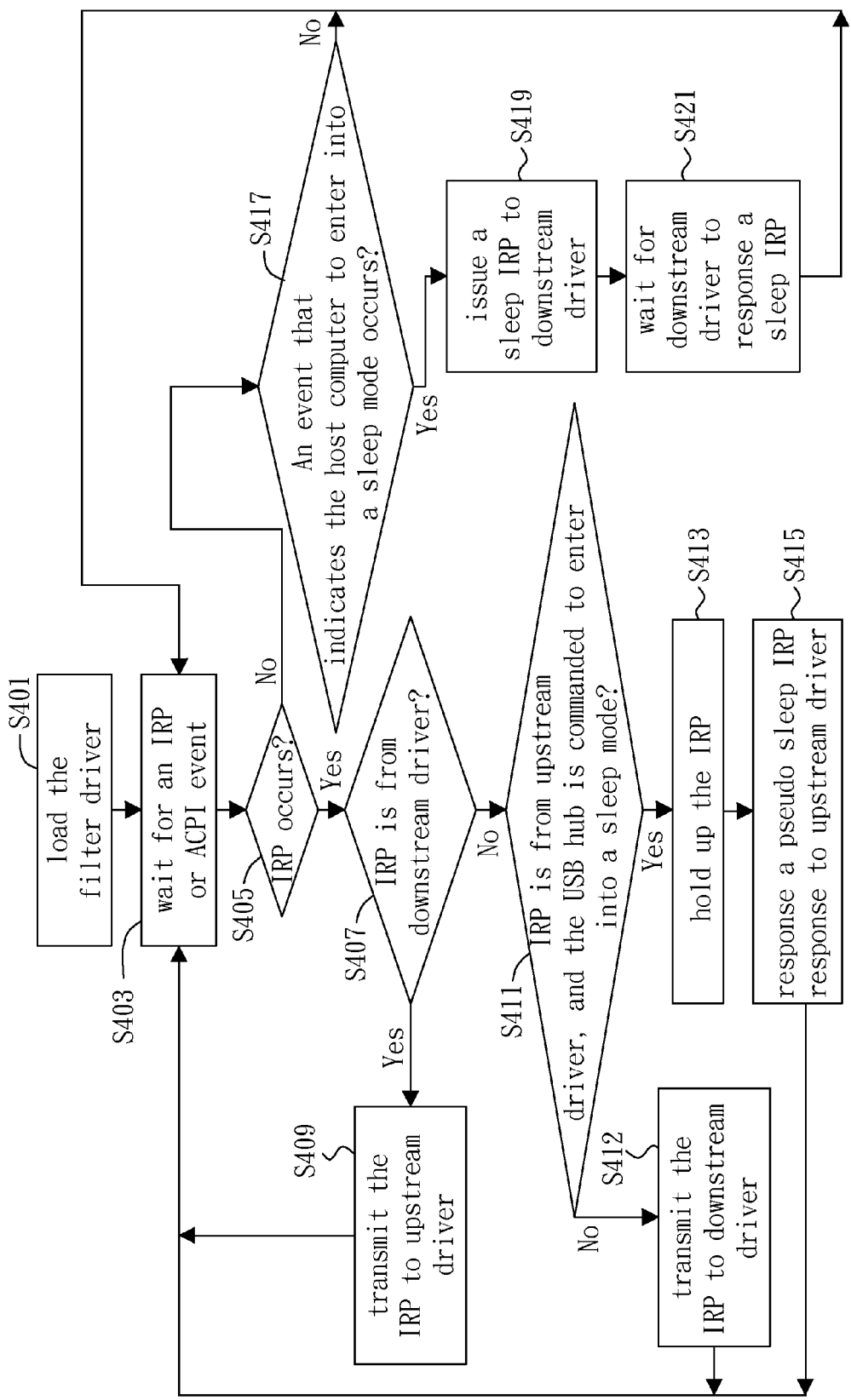
FIG. 4 shows a flow diagram illustrating a power management method according to one embodiment of the present invention.

In order to illustrate in detail, please further refer to FIG. 4. FIG. 4 shows a flow diagram illustrating a power management method according to one embodiment of the present invention. The method includes the following steps:

Initially, in step S401, the filter driver 2191 is loaded into operating system. In one embodiment, the filter driver 2191 is operated between an upstream driver and a downstream driver, as described. Flow proceeds to step S403.

In step S403, the filter driver 2191 waits for and detects whether an IRP transmission or an ACPI event occurs all the time.

In step S405, the filter driver 2191 determines whether an IRP occurs. If so, flow proceeds to step S407; otherwise, flow proceeds to step S417.

In step S407, the filter driver 2191 determines whether the IRP is transmitted from the downstream driver. If so, flow proceeds to step S409; otherwise, flow proceeds to step S411.

In step S409, the filter driver 2191 transmits the IRP to the upstream driver, and flow returns to step S403.

In step S411, it determines whether the IRP is transmitted from the upstream driver and the specific USB hub 23 is commanded by the IRP to enter into a sleep mode (i.e. the IRP is a device sleep IRP request). If so, flow proceeds to step S413. Otherwise, flow proceeds to step S412, which transmits the IRP to the downstream driver by the filter driver 2191, and flow returns to step S403.

In step S413, the filter driver 2191 holds up the IRP, and then responses a pseudo sleep IRP response to the upstream driver, and flow returns to step S403. When user plugs the portable device 25 in any of the sub connecting ports 23*a*-23*c*, the filter driver 2191 may issue a pseudo wake-up signal (not shown) to the USB hub driver 32 by detecting the situation that the above wake-up event occurs, so that data can be transmitted between the portable device 25 and the host computer 21.

In step S417, the filter driver 2191 determines whether an event that indicates the host computer 21 to enter into a sleep mode occurs. If so, flow proceeds to step S419; otherwise, flow returns to step S403.

In step S419, the filter driver 2191 issues a sleep IRP (i.e. the device sleep IRP request) to downstream driver, so that the specific USB hub 23 coupled to the interface connecting port 217 is commanded to enter into a sleep mode. Flow proceeds to step S421.

In step S421, the filter driver 2191 waits for downstream driver to response a sleep IRP response, which indicates that the USB hub 23 enters a suspend mode. Then, flow returns to step S403. In another case, before returning to step S403, the filter driver 2191 may wait for a while (until timeout).

When receiving the device sleep IRP request issued by the filter driver 2191, the USB hub 23 enters a suspend sleep. Once the USB hub 23 enters suspend sleep, the data transmission function is disabled. The USB switch is switched to use the dedicated charge circuit rather than the data transmission circuit, and when user plugs the portable device 25 in any of the sub connecting ports 23*a*-23*c*, the portable device 25 would be charged through the USB hub 23.

According to the above embodiment, the power management system and method thereof, provided in the present invention, uses a filter driver to hold up the request issued by the system. When processing the request, it also concerns and reflects the power state of the host computer to determine whether it holds up the request. Therefore, the mode of the USB hub 23 coupled to the host computer or other peripheral devices thereof can be changed in accordance with the power mode of the host computer.

Although specific embodiments have been illustrated and described, it will be appreciated by those skilled in the art that various modifications may be made without departing from the scope of the present invention, which is intended to be limited solely by the appended claims.

What is claimed is:

1. A power management system, preventing a USB hub from entering into a suspend mode while a host computer stays in a host active state, the power management system comprising:

the USB hub, having a plurality of sub connecting ports; and the host computer, having a CPU which is configured to execute an operating system (OS) and couple with the USB hub, wherein the CPU further loads a filter driver to filter IRPs, and the IRPs are transmitted between a USB hub driver and a USB host driver;

wherein, when the filter driver detects a specified event, the filter driver issues a first device sleep IRP request which controls the USB hub to enter the suspend mode, and the specified event represents that the host computer enters into a host sleep state.

2. The system of claim 1, wherein when the operating system detects that each of the sub connecting ports do not connect a portable device for a predetermined, time, the operating system issues a second device sleep IRP request to the filter driver, and when receiving the second device sleep IRP request, the filter driver prevents the second device sleep IRP request being transmitted and transmits a pseudo sleep IRP response to the operating system.

3. The system of claim 2, wherein after the filter driver transmits the pseudo sleep IRP response to the operating system, the USB hub stays in an active mode, a USB switch of the USB hub is switched to use a data transmission circuit, and at the same time, if the portable device is plugged-in the sub connecting ports, the filter driver issues a pseudo wake-up signal to the operating system, so that data can be transmitted between the portable device and the host computer through the USB hub.

4. The system of claim 2, wherein when the IRPs are not the second device sleep IRP request and the IRPs are transmitted from the USB hub driver, the filter driver transmits the IRPs to the USB host driver.

5. The system of claim 1, wherein when the filter driver receives the IRPs transmitted from the USB host driver, the filter driver transmits the IRPs to the USB hub driver.

6. A power management method for a host computer, which is coupled to a USB hub, preventing the USB hub from entering into a suspend mode while the host computer stays in a host active state, the method comprising:

loading a filter driver to filter IRPs, wherein the IRPs are transmitted between a USB hub driver and a USB host driver; and issuing a first device sleep IRP request to control the USB hub enter into the suspend mode when a specified event is detected by the filter driver;

wherein, the specified event represents that the host computer enters into a host sleep state.

7. The method of claim 6, wherein the filter driver is further used to prevent, a second device sleep IRP request being transmitted and transmit a pseudo sleep IRP response to an operating system when receiving the second device sleep IRP request, wherein, when the filter driver detects that each of sub connecting ports of the USB hub do not connect a portable device for a predetermined time, the operating system issues the second device sleep IRP request to the filter driver.

8. The method of claim 7, wherein after the filter driver transmits the pseudo sleep IRP response to the operating system, the USB hub stays in an active mode, a USB switch of the USB huh is switched to use a data transmission circuit, and at the same time, if the portable device is plugged in one of the sub connecting ports, the filter driver issues a pseudo wake-up signal to the operating system, so that data can be transmitted between the portable device and the host computer through the USB hub.

9. The method of claim 7, wherein when the IRPs are not the second device sleep IRP request and the IRPs are transmitted from the USB hub driver, the filter driver transmits the IRPs to the USB host driver.

10. The method of claim 6, when the USB hub enters the suspend mode, a USB switch of the USB hub is switched to use a dedicated charge circuit, and the portable device is charged at the suspend mode by the host computer through the USB hub when a portable device is plugged in any of the sub connecting ports of the USB hub.

11. The method of claim 6, wherein when the filter driver receives the IRPs transmitted from the USB host driver, the filter driver transmits the IRPs to the USB hub driver.

12. A storage medium, saving a filter driver which is loaded, in a host computer, which is provided for the host computer to perform a power management method, the host computer being coupled to a USB hub, the method preventing the USB hub from entering into a suspend mode while the host computer stays in a host active state, and comprising:
   loading a filter driver to filter IRPs transmitted between a USB hub driver and a USB host driver; and
   issuing a first device sleep IRP request to control the USB hub to enter into the suspend mode when a specified event is detected by the filter driver;
   wherein the specified event represents that the host computer enters into a host sleep state.

13. The storage medium of claim 12, wherein the filter driver is further used to prevent a second device sleep IRP request being transmitted and transmit a pseudo sleep IRP response to an operating system when receiving the second device sleep IRP request, wherein, when the filter driver detects that each of the sub connecting ports of the USB hub do not connect a portable device for a predetermined time, the operating system issues the second device sleep IRP request to the filter driver.

14. The storage medium of claim 12, wherein after the step of loading the filter driver, further comprises:
   plugging the portable device in one of the sub connecting ports of the USB hub; and
   the portable device is charged by the host computer through the USB hub when the USB hub enters the suspend mode or data is transmitted between the portable device and the host computer through the USB hub when the USB hub stays in an active mode.

\* \* \* \* \*